United States Patent
Kida et al.

(10) Patent No.: US 8,339,518 B2
(45) Date of Patent: Dec. 25, 2012

(54) VIDEO SIGNAL PROCESSING METHOD AND APPARATUS USING HISTOGRAM

(75) Inventors: Shingo Kida, Yokohama (JP); Kenji Kubota, Yokohama (JP)

(73) Assignee: JVC Kenwood Corporation, Kanagawa (JP)

( * ) Notice: Subject to any disclaimer, the term of this patent is extended or adjusted under 35 U.S.C. 154(b) by 375 days.

(21) Appl. No.: 12/661,291

(22) Filed: Mar. 15, 2010

(65) Prior Publication Data

US 2010/0238356 A1 Sep. 23, 2010

(30) Foreign Application Priority Data

Mar. 18, 2009 (JP) ................................. 2009-066300

(51) Int. Cl.
*H04N 5/14* (2006.01)
*H04N 5/202* (2006.01)
*G06F 13/00* (2006.01)

(52) U.S. Cl. ......... 348/672; 348/674; 345/589; 382/169

(58) Field of Classification Search .................. 348/254, 348/255, 671, 672, 674, 675, 625; 345/589; 382/169, 274; 358/3.01, 448, 522
See application file for complete search history.

(56) References Cited

U.S. PATENT DOCUMENTS

| | | | | |
|---|---|---|---|---|
| 5,012,333 A | * | 4/1991 | Lee et al. | 358/520 |
| 5,488,491 A | * | 1/1996 | Steinkirchner | 358/501 |
| 5,852,648 A | * | 12/1998 | Miyamoto et al. | 378/62 |
| 6,047,092 A | * | 4/2000 | Moro | 382/261 |
| 6,266,102 B1 | * | 7/2001 | Azuma et al. | 348/671 |
| 7,394,932 B2 | | 7/2008 | Kida et al. | 382/169 |
| 2005/0123195 A1 | * | 6/2005 | Takarada | 382/172 |
| 2005/0180629 A1 | * | 8/2005 | Masuno et al. | 382/169 |
| 2005/0212726 A1 | * | 9/2005 | Namba et al. | 345/63 |
| 2005/0232356 A1 | * | 10/2005 | Gomi et al. | 375/240.16 |
| 2005/0254707 A1 | * | 11/2005 | Takahashi | 382/169 |
| 2008/0002872 A1 | * | 1/2008 | Gatesoupe et al. | 382/132 |
| 2009/0219416 A1 | * | 9/2009 | Tsuruoka | 348/241 |

FOREIGN PATENT DOCUMENTS

JP 2006-033469 2/2006

* cited by examiner

*Primary Examiner* — Victor Kostak
(74) *Attorney, Agent, or Firm* — Renner, Kenner, Greive, Bobak, Taylor & Weber

(57) ABSTRACT

Low frequency components are extracted from a video signal for pixels in a specific area of an image carried by the signal. The low frequency components are allocated, based on luminance components of the signal, to gradations ranging from maximum to minimum levels exhibited by the luminance components, luminance histogram data being produced indicating the frequency of gradations for the pixels. The gradations are allocated to the pixels based on the luminance components to produce high-frequency component histogram data indicating the frequency of gradations for specific pixels each carrying a high frequency component. The luminance histogram data is corrected in accordance with the frequency of gradations in the high-frequency component histogram data to produce corrected luminance histogram data. A gradation correction curve is produced for correcting the gradations exhibited by the signal using the corrected data. The luminance components are corrected based on the correction curve.

14 Claims, 15 Drawing Sheets

(a)

(b)

//<br>
VIDEO SIGNAL PROCESSING METHOD AND APPARATUS USING HISTOGRAM

CROSS-REFERENCE TO RELATED APPLICATIONS

This application is based on and claims the benefit of priority from the prior Japanese Patent Application No. 2009-066300 filed on Mar. 18, 2009, the entire contents of which is incorporated herein by reference.

BACKGROUND OF THE INVENTION

The present invention relates to a method and apparatus for processing video signals, especially for enhancing visual image quality with correction of or adjustments to gradation and chrominance components of input video signals.

Video signals are processed with gamma characteristics before broadcast to display apparatus having a cathode ray tube (CRT). CRT display apparatus process these video signals with reverse gamma characteristics to display images at linear gradation.

Different from CRT display apparatus, plasma display panels (PDP) and liquid crystal display (LCD) apparatus, both types exhibiting the linear gradation characteristics, apply gamma correction to video signals already processed with gamma characteristics to process the signals with reverse gamma characteristics for displaying images at linear gradation.

Not only achieving linear gradation, gamma correction is applied to video signals to make adjustments to gamma curves constituted by input luminance signals Y-IN and output luminance signals Y-OUT in image-quality adjustments.

As prior art, for example, Japanese Unexamined Patent Publication No. 2006-033469 discloses a gradation correction apparatus including a gradation corrector having a gamma corrector that corrects gradation of luminance signals, a luminance-level histogram detector to detect the luminance-level histogram of the luminance signals, an edge-level histogram detector to detect the edge-level histogram of the luminance signals, and a gradation-correction characteristics setter to generate gradation correction characteristics based on detection results of the detectors and set the gradation correction characteristics in the gradation corrector.

The known gradation correction apparatus could, however, suffer improper gradation correction based on gradation distribution not necessarily always appropriate due to generation of a gradation correction curve with a steep gamma ramp at highly distributed luminance levels and a gentle gamma ramp at not highly distributed luminance levels in the luminance-level histogram with no consideration of image spatial information.

Adjustments to the gamma ramp, for example, a steeper gamma ramp for flat gradation (with almost no change in gradation) at a dark zone that occupies a relatively large zone of an image could cause a bigger gradation difference to the dark zone to emphasize false edge or noise components at the dark zone. It also could emphasize black floating at the dark zone to lower contrast, which leads to lowered image quality.

Moreover, a steeper gamma ramp for a high luminance-level section (such as, the sky), with almost no change in gradation, that also occupies a large zone of an image could cause an object (a building, human being, etc.) at an intermediate luminance-level section to suffer a gentler gamma ramp, resulting in lower contrast and dark impression to viewers.

SUMMARY OF THE INVENTION

A purpose of the present invention is to provide a method and apparatus for processing video signals with gradation correction based on appropriate gradation distribution to produce high-contrast and quality images.

The present invention provides a video signal processing method comprising the steps of: extracting low frequency components from an input video signal at frequencies equal to or lower than a reference frequency, for pixels contained in a specific area of an image carried by the input video signal; allocating the low frequency components, based on luminance signal components of the input video signal, to a plurality of gradation levels that range from maximum to minimum luminance levels exhibited by the luminance signal components, thus producing luminance histogram data that indicates the frequency of the gradation levels for the pixels; allocating the gradation levels to the pixels based on the luminance signal components to produce high-frequency component histogram data that indicates the frequency of the gradation levels for specific pixels among the pixels, each specific pixel carrying a high frequency component equal to or higher than a reference high frequency; correcting the luminance histogram data in accordance with the frequency of the gradation levels in the high-frequency component histogram data to produce corrected luminance histogram data; producing a gradation correction curve for correcting the gradation exhibited by the input video signal using the corrected luminance histogram data; and correcting the luminance signal components of the input video signal based on the gradation correction curve.

Moreover, the present invention provides a video signal processing apparatus comprising: a low-frequency component extractor to extract low frequency components from an input video signal at frequencies equal to or lower than a reference frequency, for pixels contained in a specific area of an image carried by the input video signal; a luminance histogram data producer to allocate the low frequency components, based on luminance signal components of the input video signal, to a plurality of gradation levels that range from maximum to minimum luminance levels exhibited by the luminance signal components, thus producing luminance histogram data that indicates the frequency of the gradation levels for the pixels; a high-frequency component histogram data producer to allocate the gradation levels to the pixels based on the luminance signal components to produce high-frequency component histogram data that indicates the frequency of the gradation levels for specific pixels among the pixels, each specific pixel carrying a high frequency component equal to or higher than a reference high frequency; a processor to correct the luminance histogram data in accordance with the frequency of the gradation levels in the high-frequency component histogram data to produce corrected luminance histogram data and to produce a gradation correction curve for correcting the gradation exhibited by the input video signal using the corrected luminance histogram data; and a gradation corrector to correct the luminance signal components of the input video signal based on the gradation correction curve.

DETAILED DESCRIPTION OF PREFERRED EMBODIMENTS

Preferred embodiments of a video signal processing method and a video signal processing apparatus according to the present invention will be disclosed with reference to the attached drawings.

Figure 1:
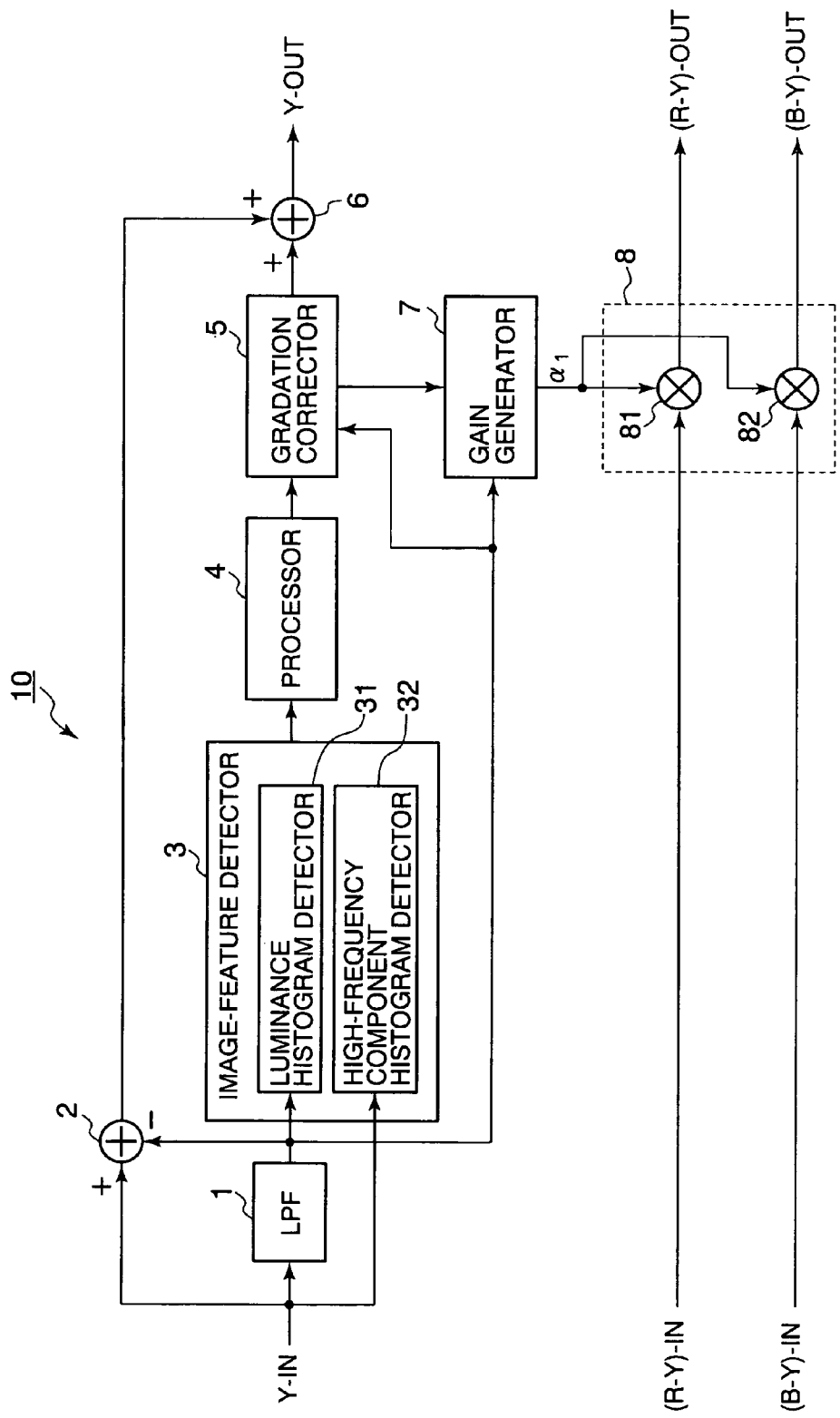
FIG. 1 shows a block diagram of an embodiment of a video signal processing apparatus according to the present invention.

FIG. 1 shows a block diagram of an embodiment of a video signal processing apparatus according to the present invention.

As shown in FIG. 1, a video signal processing apparatus is equipped with: a low-pass filter (LPF) 1, or a low-frequency component extractor, that allows low frequency components of an input luminance signal (Y-IN), a luminance component of an input video signal, to pass therethrough, at a predetermined upper-limit frequency or lower; an adder 2 to obtain high frequency components of the input luminance signal; an image-feature detector 3 to detect the features of an image carried by the input luminance signal; a processor 4 to process the signal output from the detector 3; a gradation corrector 5 to apply gradation correction to the low frequency components of the luminance signal in accordance with a gradation correction curve based on gamma data output from the processor 4; an adder 6 to add the high frequency components from the adder 2 and gradation-corrected low frequency components of the luminance signal thus applied the gamma correction by the corrector 5, to produce a gradation-corrected luminance signal in the same frequency band as the input luminance signal; a chrominance gain generator 7 to generate a chrominance gain based on the low frequency components from the LPF 1 and the gradation-corrected low frequency components from the corrector 5; and a multiplier unit 8 to multiply chrominance signals (R-Y) and (B-Y) by the chrominance gain.

Figure 2:
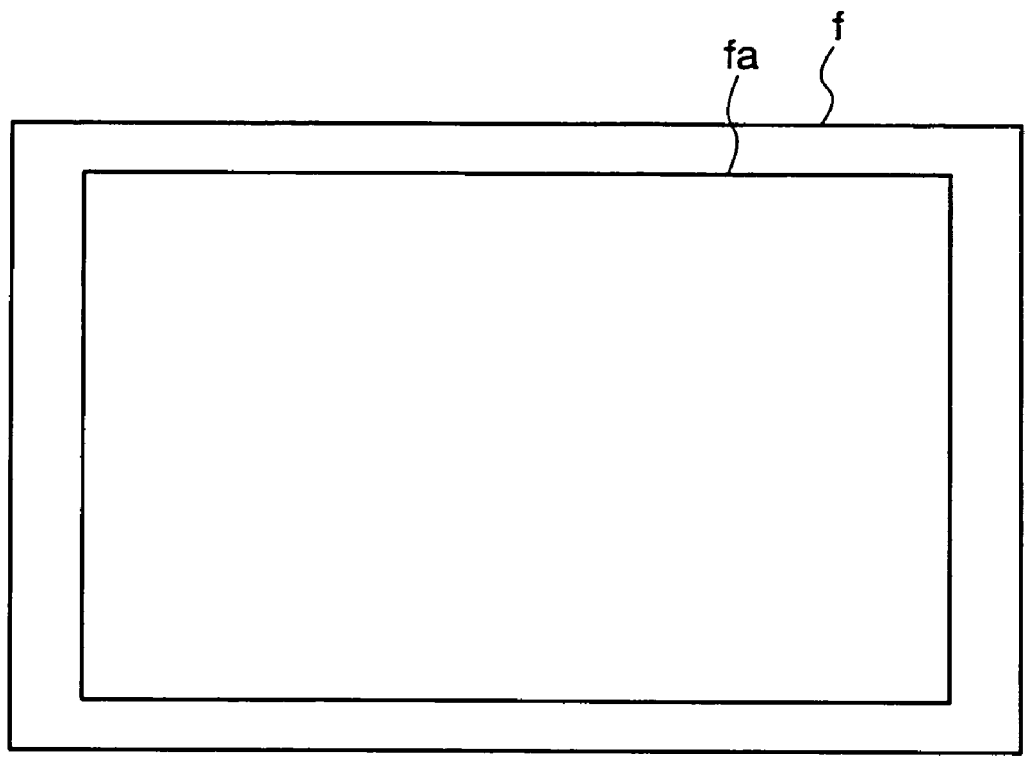
FIG. 2 illustrates a judging zone "fa" in a picture plane "f" according to the present invention.

The image-feature detector 3 is equipped with a luminance histogram detector 31 and a high-frequency component histogram detector 32. The detector 3 is provided with a judging zone "fa" in a picture plane "f" that is one field or one frame, as illustrated in FIG. 2. Based on luminance levels of a plurality of pieces of pixel data in the judging zone "fa", the detectors 31 and 32 produce luminance histogram data and high-frequency component histogram data, respectively, as a luminance histogram data producer and a high-frequency component histogram data producer, respectively.

Histogram data is produced per field or frame in this embodiment, and this is optimum. It may, however, be produced per plural number of fields or frames. In other words, one requirement for histogram data is that it is produced per specific unit (duration) of image plane. The judging zone "fa" can have any size within an effective duration of image plane.

Described next in detail is the operation of each circuit component of the video signal processing apparatus 10 in this embodiment of the present invention.

The LPF 1 allows low frequency components of an input luminance signal (Y-IN) to pass therethrough, at a predetermined upper-limit frequency or lower. The input luminance signal may be an interlaced or a progressive signal. The LPF 1 performs filtering so that the subsequent-stage circuitry can apply gradation correction only to the low frequency components, not the high frequency components, to restrict emphasis of noise components.

The adder 2 adds the input luminance signal and the inverse signal of the low frequency components of the input luminance signal from the LPF 1, thus outputting the high frequency components of the input luminance signal without including the low frequency components to be applied with the gradation correction, as described above.

In the image-feature detector 3: the luminance histogram detector 31 receives the low frequency components from the LPF 1 and produces luminance histogram data; while the high-frequency component histogram detector 32 receives the input luminance signal and produces high-frequency component histogram data of the input signal.

The luminance histogram detector 31 and the high-frequency component histogram detector 32 will be described in detail with reference to FIGS. 3 and 4, respectively.

Figure 3:
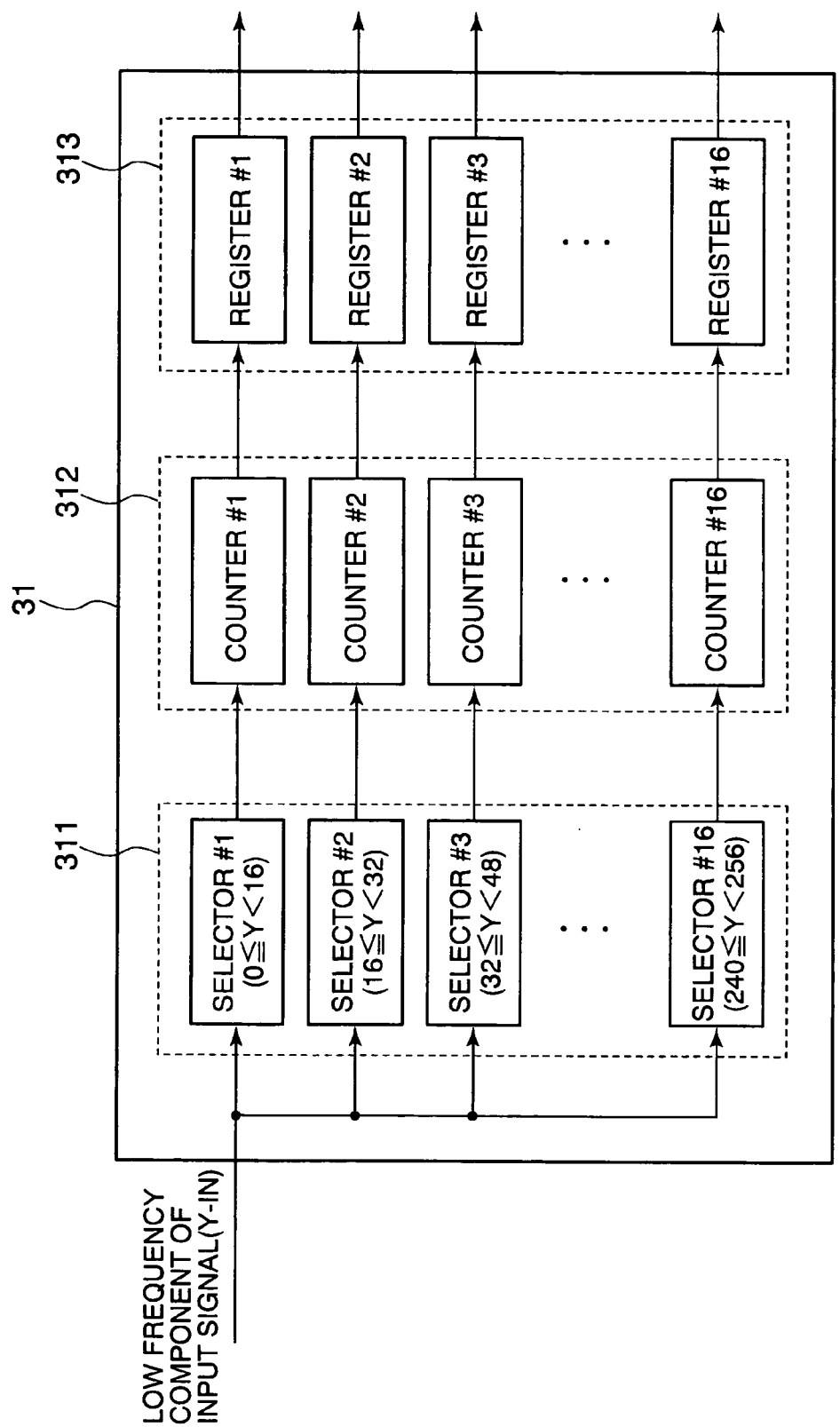
FIG. 3 shows an exemplary block diagram of a luminance histogram detector installed in the video signal processing apparatus according to the present invention.

FIG. 3 shows an exemplary block diagram of the luminance histogram detector 31.

The luminance histogram detector 31 is equipped with a selector unit 311, a counter unit 312, and a register unit 313 including a plurality of selectors, counters, and registers, respectively.

The selector unit 311 is constituted by 16 selectors #1 to #16, in this embodiment. A luminance level range (from the maximum to minimum luminance levels) into which the low frequency components of the input luminance signal (Y-IN) are fallen is divided into 16 luminance level zones (gradations) and allocated to the 16 selectors #1 to #16, in this embodiment. Each selector outputs a signal of "1" when it receives a low frequency component having a luminance level fallen into the allocated luminance level zone, among the low frequency components of the input luminance signal (Y-IN). However, each selector outputs a signal of "0" when it receives a low frequency component having a luminance level out of the allocated luminance level zone. In this way, the selector unit 311 determines which of the 16 luminance level zones the luminance level of a low frequency component input per pixel is fallen into.

In this embodiment, the low frequency components input to the selector unit 311 have luminance levels in 256 gradations from 0 to 256 and the luminance level range of the input low frequency components is divided into 16 luminance level zones each covering 16 gradations. Therefore, for example, for a pixel of a low frequency component having "40" in luminance level, the selector #3 allocated to which is a luminance level zone of $32 \leq Y < 48$ outputs a signal of "1" whereas the other 15 selectors output a signal of "0".

The counter unit 312 is constituted by 16 counters #1 to #16 corresponding to the selectors #1 to #16, respectively. The counters #1 to #16 count up by 1 whenever receiving a signal of "1" from the corresponding selectors #1 to #16. The value counted by each counter indicates the total number of pixels each having a luminance level in the luminance level zone allocated to the corresponding selector.

The register unit 313 is constituted by 16 resisters #1 to #16 corresponding to the counters #1 to #16 of the counter unit 312, respectively, to hold values counted by the corresponding counters.

With the selector, counter, and register units 311, 312, and 313, the luminance histogram detector 31 counts and holds the number of pixels having luminance levels in each of the 16 luminance level zones. The data held by the detector 31 is supplied to the processor 4 (FIG. 1) as luminance histogram data that indicates the frequency of gradation levels in the luminance histogram.

Figure 4:
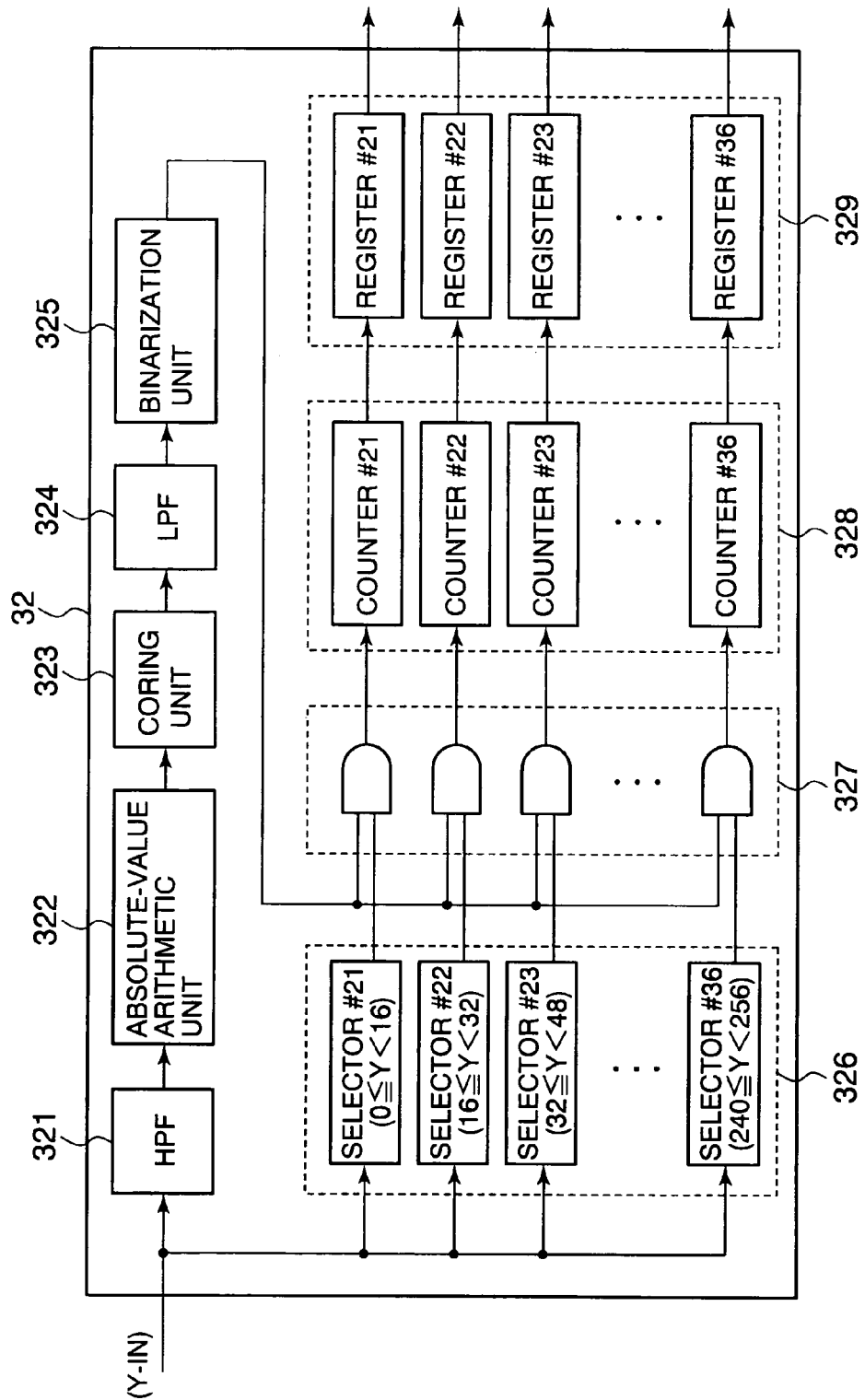
FIG. 4 shows an exemplary block diagram of a high-frequency component histogram detector installed in the video signal processing apparatus according to the present invention.

FIG. 4 shows an exemplary block diagram of the high-frequency component histogram detector 32.

The high-frequency component histogram detector 32 is equipped with: a high-pass filter (HPF) 321 that allows high frequency components of the input luminance signal (Y-IN) to pass therethrough, at a predetermined frequency or higher; an absolute-value arithmetic unit 322 to obtain an absolute value of high frequency components supplied from the HPF 321; a coring unit 323 to perform coring to the signal from the arithmetic unit 322 for noise removal; an LPF 324 to restrict noises of a signal from the coring unit 323 by low-frequency range filtering in the horizontal and vertical dimensions; and a binarization unit 325 to binarize a signal from the LPF 324.

Moreover, in this embodiment, the high-frequency component histogram detector 32 is equipped with: a selector unit 326 (with 16 selectors #21 to #36) to determine, per pixel, which of luminance-level zones a luminance level of the input luminance signal falls into; a logic gate unit 327 having 16 AND gates; a counter unit 328 having 16 counters #21 to #36; and a register unit 329 having 16 register #21 to #36.

Described next in detail is the operation of each circuit component of the high-frequency component histogram detector 32 in this embodiment of the present invention.

Figure 5:
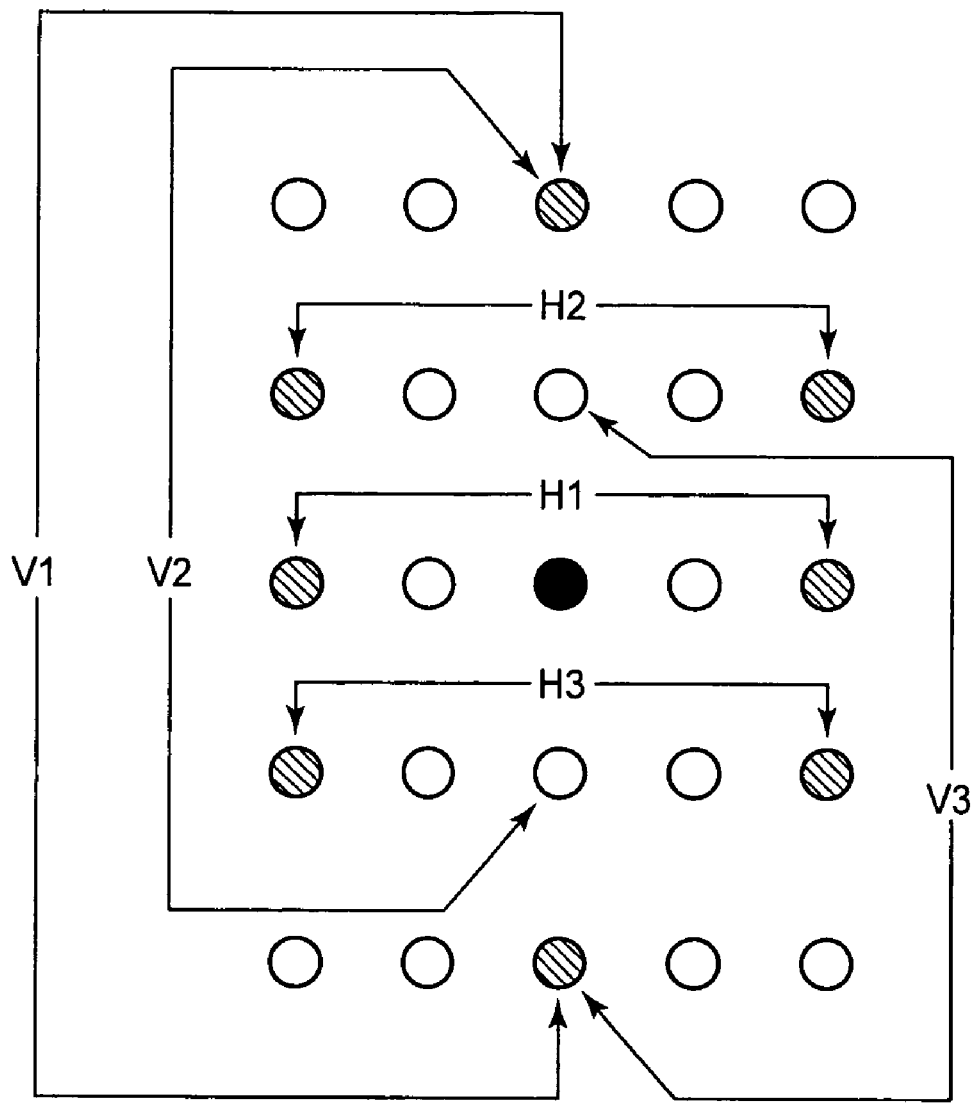
FIG. 5 illustrates an operation of a high-pass filter of the high-frequency component histogram detector according to the present invention.

The HPF 321 generates a difference value in luminance between pixels that surround a target pixel that is each pixel of the input luminance signals (Y-IN). As illustrated in FIG. 5, in this embodiment, the HPF 321 generates difference values between pixels that surround a target pixel indicated by a black spot at the center, among the surrounding 24 pixels, in 25 pixels (5×5 in the horizontal and vertical directions) in total. In detail, the HPF 321 generates a difference value between two surrounding pixels (separated by three pixels from each other) indicated by a striped spot in each of three horizontal directions H1, H2, and H3, and also in each of three vertical directions V1, V2, and V3. Thus, the HPF 321 generates three difference values in the horizontal directions and also the vertical directions, six difference values in total.

The absolute-value arithmetic unit 322 obtains the absolute values of the six difference values supplied from the HPF 321.

The coring unit 323 performs coring to the absolute values of the six difference values from the absolute-value arithmetic unit 322, with the following procedures:

(1) comparison between a predetermined reference value and the absolute values of the six difference values from the absolute-value arithmetic unit 322, to output "0" for each absolute value if smaller than the reference value whereas obtain a difference value for each absolute value if equal to or larger than the reference value, for removal of small noise components;

(2) selection of difference values among those obtained for the absolute values equal to or larger than the reference value in the comparison procedure (1), that are equal to or smaller than a predetermined upper-limit value; and (3) comparison between the difference values selected in the selection procedure (2), in the directions H1 and V1 (FIG. 5), to select a larger one, in the directions H2 and V2, to select a larger one, and in the directions H3 and V3, to select a larger one, three larger difference values in total.

The LPF 324 applies weighting to the three larger difference values from the coring unit 323 in the horizontal and vertical dimensions, to output an average signal. The weighting is smaller as the distance between the target pixel and the surrounding pixel is larger.

The binarization unit 325 outputs a binary signal of "1" in one bit if the average signal from the LPF 324 is larger than a predetermined reference value whereas "0" in one bit if equal to or smaller than the reference value, thus binarizing the average signal and outputting a signal of "1" if a target pixel carries a high frequency component.

The selector unit 326 is constituted by 16 selectors #21 to #36, like the selector unit 311 (FIG. 3). A luminance level range from 0 to 255 into which the luminance level of the input luminance signal (Y-IN) is fallen is divided into 16 luminance level zones (gradations) and allocated to the 16 selectors #21 to #36, in this embodiment. Each selector outputs a signal of "1" when the input luminance signal has a luminance level in the allocated luminance level zone. However, each selector outputs a signal of "0" when the input luminance signal has a luminance level out of the allocated luminance level zone. In this way, selector unit 326 outputs a level judging signal (a binary signal) indicating that the luminance level of the input luminance signal, per pixel, is fallen into a particular luminance level zone.

The logic gate unit 327 is constituted by 16 AND gates. Each gate has two input terminals: one for receiving the level judging signal from the corresponding selector among the selectors #21 to #36 of the selector unit 326; and the other for receiving the binary signal from the binarization unit 325 indicating whether a target pixel (the input luminance signal) carries a high frequency component, the binary signal being supplied to all of the 16 AND gates. Each AND gate performs logical conjunction on the level judging and binary signals and supplies a result of the logical conjunction to the corresponding counter among the counters #21 to #36 of the counter unit 328.

Accordingly, each AND gate of the logic gate unit 327 outputs a signal indicating whether a target pixel carries a high frequency component of the input luminance signal and the luminance level of this high frequency component falls into any of the 16 luminance level zones. When the luminance level of the input luminance signal is, for example "40", the selector #23 of the selector unit 326 allocated with the luminance level zone $32 \leq Y < 48$ outputs a signal of "1" whereas the other 15 selectors output a signal of "0". And then, when the target pixel carries a high frequency component, the AND gate of the logic gate unit 327, corresponding to the selector #23, outputs a signal of "1" whereas the other 15 AND gates output a signal of "0".

Each of the counters #21 to #36 of the counter unit 328 counts up by 1 whenever it receives a signal of "1" from the corresponding AND gate of the logic gate unit 327. The value counted by each counter of the counter unit 328 indicates the number of pixels that carry high frequency components having luminance levels fallen into the luminance level zone that is allocated to the sector of the selector unit 326 corresponding to each counter.

The register unit 329 is constituted by 16 resisters #21 to #36 corresponding to the counters #21 to #36 of the counter unit 328, respectively, to hold values counted by the corresponding counters.

With the selector, logic gate, counter, and register units 326, 327, 328, and 329, the high-frequency component histogram detector 32 counts and holds the number of pixels having luminance levels fallen into the 16 luminance level zones. The data held by the register units 329 is supplied to the processor 4 (FIG. 1) as high-frequency component histogram data that indicates the frequency of gradation levels in the high-frequency component histogram.

As described later in detail, on receiving the luminance and high-frequency component histogram data from the luminance and high-frequency component histogram detectors 31 and 32, respectively, the processor 4 performs a specific computation to these histogram data to produce corrected luminance histogram data. Then, the processor 4 produces a plurality of values (gamma data) that constitute a gradation correcting curve for each picture plane "f" (FIG. 2), based on the corrected luminance histogram data, the gamma data being supplied to the gradation corrector 5.

The detailed operation of the processor 4 is as follows, with respect to a flowchart shown in FIG. 6:

obtaining luminance histogram data and high-frequency component histogram data that indicate the features of images, in step S41;

performing a luminance histogram correction procedure (which will be described later) to the luminance histogram data based on the high-frequency component histogram data to produce corrected luminance histogram data, in step S42;

calculating variances of luminance histogram using the corrected luminance histogram data and performing a gain-corrected value calculation procedure using the calculated variances to produce gain-corrected values, in step S43;

performing an integration and a normalization procedure to calculate a plurality of values (gamma data) that constitute gradation correcting curves for correcting gradation of input video signals, using the corrected luminance histogram data and the gain-corrected values, in step S44;

performing a limiting procedure to the gamma data with a normalization procedure (a normalization limiting procedure), in step S45;

performing a time-domain leaky integration procedure to the gamma data that have underwent the normalization limiting procedure, in step S46; and supplying the gamma data that have underwent the leaky integration procedure to the gradation corrector 5 for gamma-data settings, in step S47, the process returning to step S41.

Each procedure shown in FIG. 6 will be described further in detail.

Figure 7:
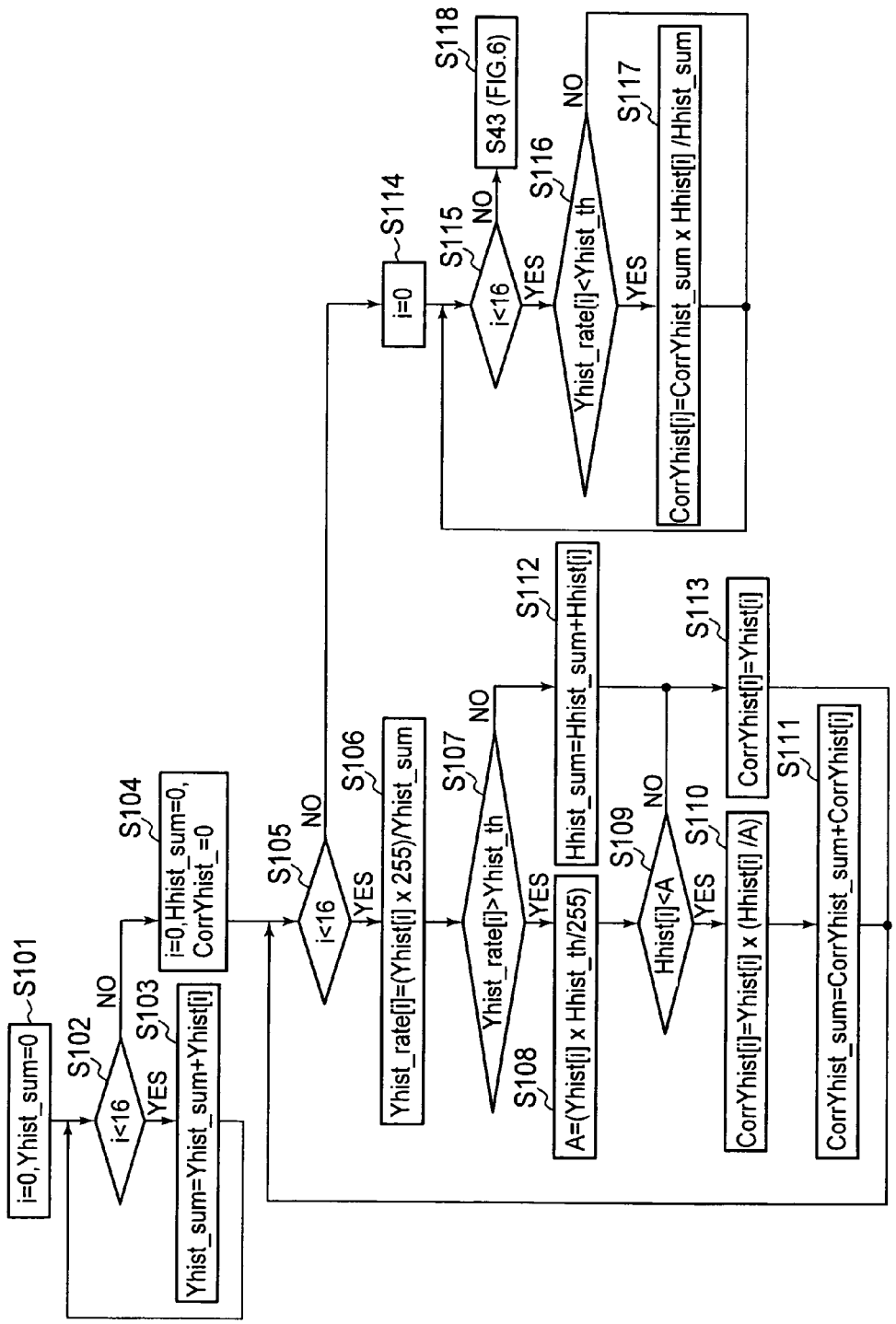
FIG. 7 shows a flowchart of a luminance histogram correction procedure performed in step S42 of FIG. 6.

FIG. 7 shows a flowchart of the luminance histogram correction procedure performed in step S42.

The processor 4 performs the luminance histogram correction procedure to luminance histogram data Yhist[i] based on high-frequency component histogram data Hhist[i] to produce corrected luminance histogram data CorrYhist[i], "i" being a variable (a positive integer) from 0 to 16 in gradation, as follows:

initializing both of the variable "i" and an integral value Yhist_sum (which will be obtained later) of the luminance histogram data Yhist[i] to "0", in step S101;

determining whether the variable "i" is smaller than "16", in step S102 (proceeding to step S103 if smaller than "16" whereas to step S104 if equal to or larger than "16");

in step S103, calculating an integral value Yhist_sum of the luminance histogram data Yhist[i] according to an equation (1) shown below, $$Yhist\_sum = Yhist\_sum + Yhist[i] \quad (1)$$

whereby a calculated integral value Yhist_sum is temporarily stored in a memory (not shown) of the processor 4, followed by incrementing the variable "i" by "1" (returning to step S102 and repeating step S103 to calculate the integral value Yhist_sum until the variable "i" becomes "15");

whereas, in step S104, initializing all of the variable "i", the integral value Hhist_sum of the high-frequency component histogram data Hhist[i], and the integral value CorrYhist_sum of the corrected luminance histogram data CorrYhist[i] to "0";

following to step S104, determining whether the variable "i" is smaller than "16", in step S105 (proceeding to step S106 if "i" is smaller than "16" whereas to step S114 if equal to or larger than "16");

in step S106, calculating a ratio Yhist_rate[i] of the luminance histogram data Yhist[i] to the integral value Yhist_sum according to an equation (2) shown below, $$Yhist\_rate[i] = (Yhist[i] \times 255)/Yhist\_sum \quad (2)$$

following to step S106, determining whether the ratio Yhist_rate[i] is larger than a reference value Yhist_th, in step S107 (proceeding to step S108 if Yhist_rate[i] is larger than Yhist_th whereas to step S112 if equal to or smaller than Yhist_th);

in step S108, calculating a value "A" to be compared with the high-frequency component histogram data Hhist[i] using the luminance histogram data Yhist[i] and a reference value Hhist_th according to an equation (3) shown below, $$A = Yhist[i] \times Hhist\_th/255 \quad (3)$$

following to step S108, determining whether the high-frequency component histogram data Hhist[i] is smaller than the value "A", in step S109 (proceeding to step S110 if Hhist[i] is smaller than "A" whereas to step S113 if equal to or larger than "A");

in step S110, calculating corrected luminance histogram data CorrYhist[i] according to an equation (4) shown below, $$CorrYhist[i] = Yhist[i] \times (Hhist[i]/A) \quad (4)$$

following to step S110, calculating an integral value CorrYhist_sum of the corrected luminance histogram CorrYhist[i], in step S111, according to an equation (5) shown below, $$CorrYhist\_sum = CorrYhist\_sum + CorrYhist[i] \quad (5)$$

whereas, if Yhist_rate[i] is equal to or smaller than Yhist_th in step S107, calculating an integral value Hhist_sum of the high-frequency component histogram data Hhist[i], in step S112, according to an equation (6) shown below, $$Hhist\_sum = Hhist\_sum + Hhist[i] \quad (6)$$

following to step S112, calculating corrected luminance histogram data CorrYhist[i], in step S113, according to an equation (7) shown below, $$CorrYhist[i] = Yhist[i] \quad (7)$$

whereby the corrected luminance histogram data CorrYhist[i] obtained according to the equation (4) or (7), the integral value CorrYhist_sum of the corrected luminance histogram CorrYhist[i] obtained according to the equation (5), and the integral value Hhist_sum of the high-frequency component histogram data Hhist[i] obtained according to the equation (6) are temporarily stored in a memory (not shown) of the processor 4;

on completion of step S111 or S113, incrementing the variable "i" by "1" (returning to step S105 and repeating steps S105 to S113 until the variable "i" becomes "15");

initializing the variable "i" to "0" in step S114 when it is determined that the variable "i" is equal to or larger than "16" in step S105, followed by determining whether the variable "i" is smaller than "16" in step S115 (proceeding to step S116 if "i" is smaller than "16" whereas to step S118 if equal to or larger than "16");

determining, in step S116, whether the ratio Yhist_rate[i] obtained according to the equation (2) is smaller than the reference value Yhist_th (proceeding to step S117 if Yhist_rate[i] is smaller than Yhist_th whereas to step S115 after incrementing the variable "i" by "1" if equal to or larger than Yhist_th);

in step S117, calculating corrected luminance histogram data CorrYhist[i] using the integral value CorrYhist_sum of the corrected luminance histogram data CorrYhist[i], the high-frequency component histogram data Hhist[i], and the integral value Hhist_sum of Hhist[i] according to an equation (8) shown below, $$CorrYhist = CorrYhist\_sum \times Hhist[i]/Hhist\_sum \quad (8)$$

whereby the corrected luminance histogram data CorrYhist[i] is temporarily stored in a memory (not shown) of the processor 4; and on completion of step S117, incrementing the variable "i" by "1" (returning to step S115 and repeating steps S115 to S117 until the variable "i" becomes "15");

whereas, when it is determined that the variable "i" is equal to or larger than "16", proceeding to step S118 to perform step S43 (FIG. 6) using the corrected luminance histogram data CorrYhist[i] (i=0 to 15) obtained in steps S111 and S117.

Figure 8:
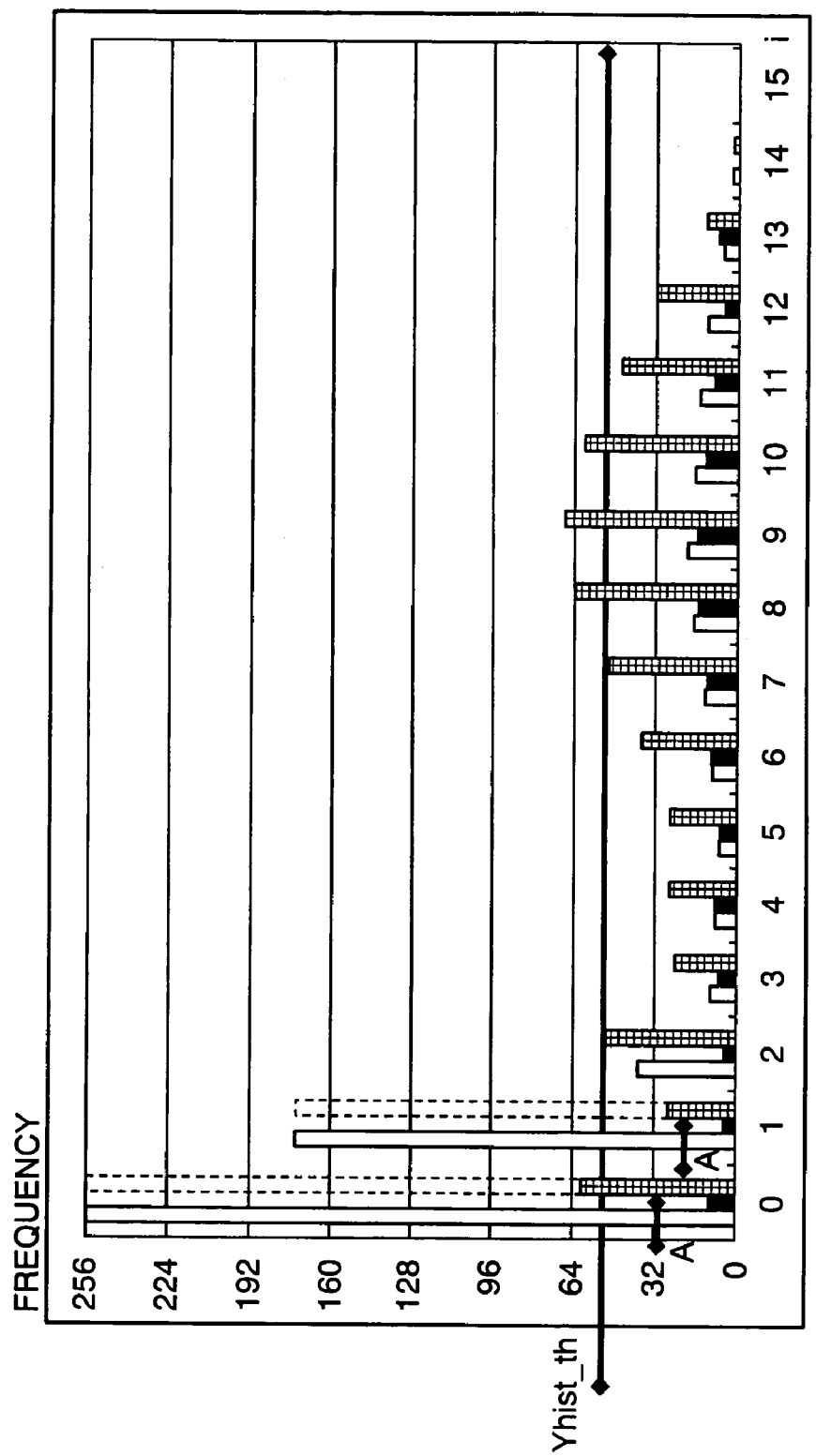
FIG. 8 is an exemplary graph indicating results of the luminance histogram correction procedure performed in step S42.

Shown in FIG. 8 is an exemplary graph indicating the results of the luminance histogram correction procedure performed in step S42 described above with respect to FIG. 7.

In the graph of FIG. 8, abscissa and ordinate values indicate the variable (gradation) "i" and frequency of histogram data, respectively. Moreover, in the graph of FIG. 8, white, black, and grid bars indicate luminance histogram data Yhist[i] before correction, high-frequency component histogram data Hhist[i], and luminance histogram data CorrYhist[i] after correction, respectively.

An image that exhibits the luminance histogram shown in FIG. 8 carries an image of a bright object section in a small area with a dark flat (in gradation) section that occupies a large area.

The luminance histogram of such an image before correction exhibits the gradation "i" of "0" and "1" at high frequency whereas "2" to "15" at low frequency, as indicated by the white bars in FIG. 8.

In the embodiment, the luminance histogram correction procedure (step S42) is performed to an image with such luminance histogram before correction, as described with respect to FIG. 7.

The resultant luminance histogram after correction (after step S42) exhibits, as indicated by the grid bars in FIG. 8, the gradation "i" of "0" and "1" at low frequency, deleted as indicated by broken-line bars, whereas "2" to "13" at high frequency, with the gradations given.

Accordingly, the luminance histogram correction procedure (step S42) serves to give the gradation of a dark section once given to a large area of an image to a bright section of a small area of the image.

The total sum of the luminance histogram data Yhist[i] before correction and that of the luminance histogram data CorrYhist[i] after correction are substantially equal to each other (with a very small ignorable difference due to calculation error).

Figure 9:
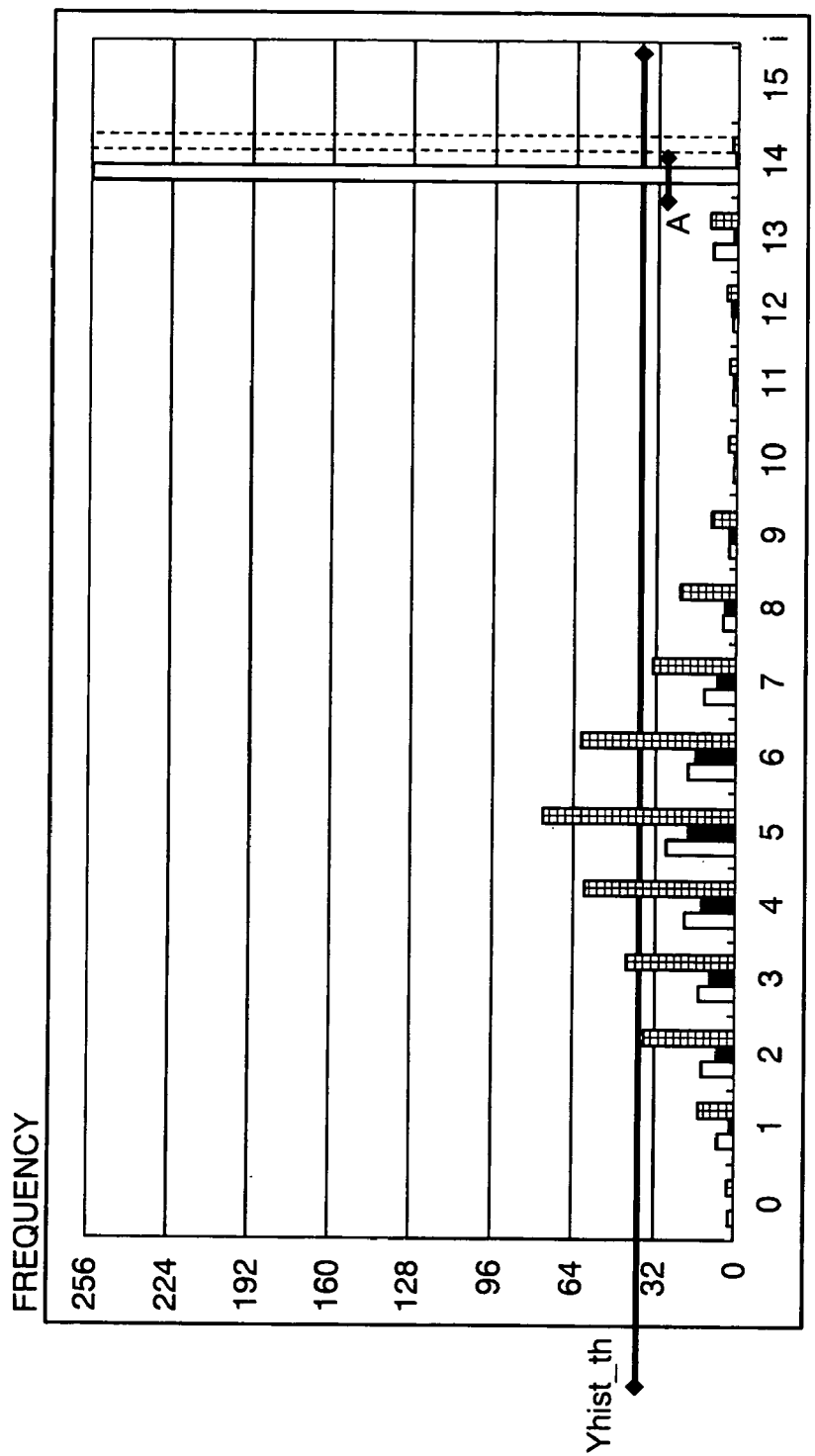
FIG. 9 is another exemplary graph indicating results of the luminance histogram correction procedure performed in step S42.

Shown in FIG. 9 is another exemplary graph indicating the results of the luminance histogram correction procedure performed in step S42 (FIG. 7).

In the graph of FIG. 9, in the same way as in FIG. 8, abscissa and ordinate values indicate the variable (gradation) "i" and frequency of histogram data, respectively, with white, black, and grid bars indicating luminance histogram data Yhist[i] before correction, high-frequency component histogram data Hhist[i], and luminance histogram data CorrYhist[i] after correction, respectively.

An image that exhibits the luminance histogram shown in FIG. 9 carries an image of an object (a building, a human, etc.) section at intermediate luminance levels with a bright flat (in gradation) section, such as sky, that occupies a large area.

The luminance histogram of such an image before correction exhibits the gradation "i" of "14 at high frequency whereas "1" to "9" at low frequency, as indicated by the white bars in FIG. 9.

In the embodiment, the luminance histogram correction procedure (step S42) is also performed to an image with such luminance histogram before correction, as described with respect to FIG. 7.

The resultant luminance histogram after correction (after step S42) exhibits, as indicated by the grid bars in FIG. 9, the gradation "i" of "14" at low frequency, deleted as indicated by broken-line bars, whereas "1" to "9" at high frequency, with the gradations given.

Accordingly, the luminance histogram correction procedure (step S42) serves to give the gradation of a bright flat section once given to a large area of an image to an object section at intermediate luminance levels.

Described next in detail is step S43 in which the processor 4 calculates variances of luminance histogram using the corrected luminance histogram data and performs a gain-corrected value calculation procedure using the calculated variances to produce gain-corrected values.

The procedure firstly performed by the processor 4 in step S43 is calculation of an average CorrYhist_Ave of the corrected luminance histogram data CorrYhist[i] produced in step S42, according to an equation (9) shown below, $$CorrYHist\_Ave = \left(\sum_{i=0}^{15} CorrYhist[i]\right) \bigg/ 16 \quad (9)$$

The following procedure performed by the processor 4 in step S43 is calculation of an variance SS using the average CorrYhist_Ave obtained as above, according to an equation (10) shown below, $$SS = \sum_{i=0}^{15} \{abs(CorrYhist[i] - CorrYhist\_Ave) \times 16 / CorrYhist\_Ave\} \quad (10)$$

in which a sign "abs" means taking an absolute value and the variance SS becomes a large value when the luminance levels in the corrected luminance histogram data CorrYhist[i] converge on a specific variable (gradation) "i" whereas a small value when diverge on a wide range of gradation levels.

The next procedure performed by the processor 4 in step S43 is calculation of a gain-correcting value using the variance SS.

Figure 10:
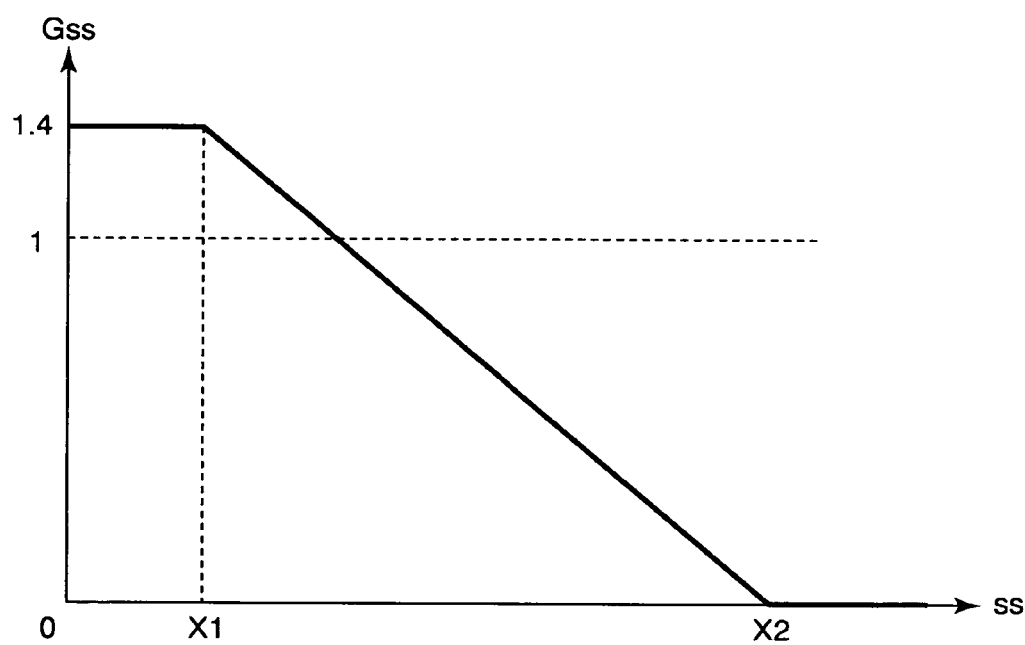
FIG. 10 shows an exemplary characteristic curve to be used in calculation of a gain-correcting value, according to the present invention.

FIG. 10 shows an exemplary characteristic curve used by the processor 4 in calculation of a gain-correcting value, with abscissa and ordinate values indicating the variance SS and gain-correcting value Gss, respectively.

As shown in FIG. 10, for example, when the variance SS takes the value of "0" to "x1", the gain-correcting value Gss takes the value of "1. 4" because the luminance levels in the corrected luminance histogram data CorrYhist[i] diverge on a wide range of gradation levels.

In contrast, when the variance SS takes the value of "x1" to "x2", the gain-correcting value Gss takes a smaller value as the variance SS takes a larger value, or as the luminance levels in the corrected luminance histogram data CorrYhist[i] converge on a specific gradation.

For the variance SS of "x2" or larger, the processor 4 gives the gain-correcting value Gss the value of "0" (or another small value) because the luminance levels in the corrected luminance histogram data CorrYhist[i] are considered as converging on a specific gradation.

As will be discussed later, an extremely steep gamma curve is inevitably obtained by an algorism for calculating gamma data based on the difference between the corrected luminance histogram data CorrYhist[i] and the average CorrYhist_Ave when CorrYhist[i] converges on a specific gradation, resulting in a large value in the difference between CorrYhist[i] and CorrYhist_Ave.

In contrast, an almost linear gamma curve thus not effective is inevitably obtained by the algorism described above when CorrYhist[i] diverge on a wide range of gradation levels, resulting in a small value in the difference between CorrYhist[i] and CorrYhist_Ave.

For the reason above, the gain-correcting value Gss is used for achieving constant dynamic gamma correction performance in any scenes in images.

Figure 6:
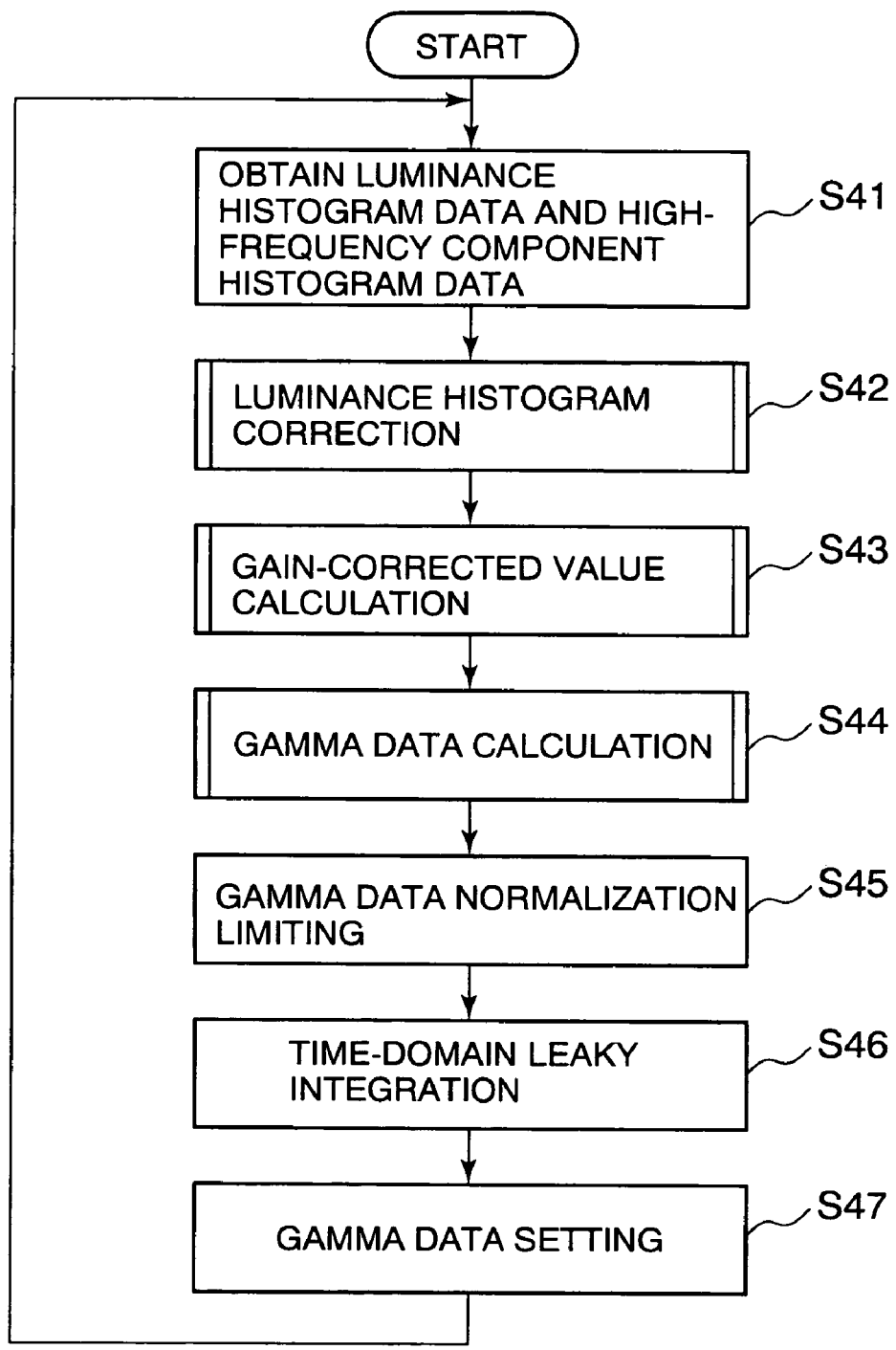
FIG. 6 shows a flowchart that indicates several procedures performed by a processor installed in the video signal processing apparatus according to the present invention.
Figure 11:
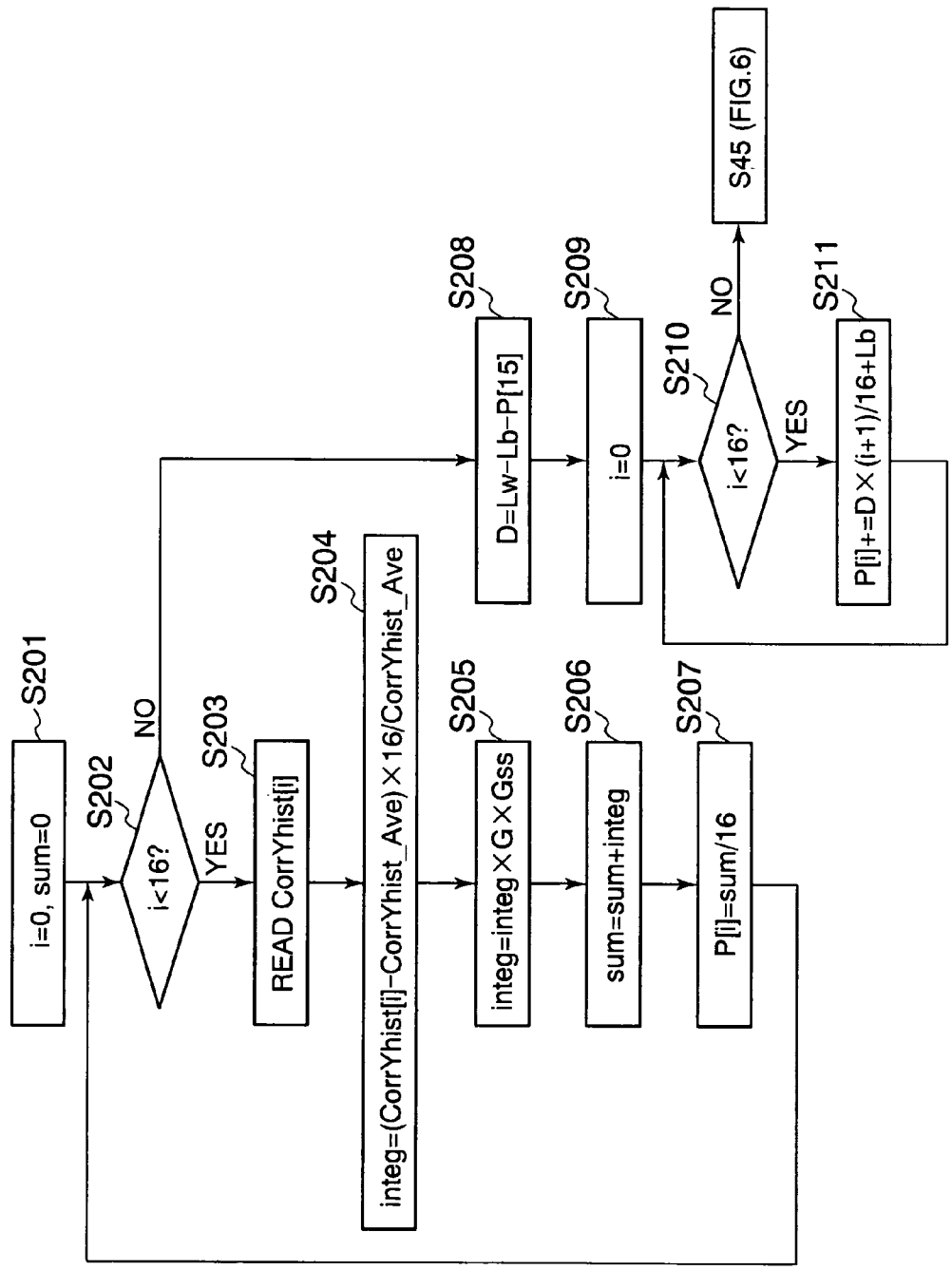
FIG. 11 shows a flowchart of several procedures performed in step S44 of FIG. 6.

Described next with respect to a flowchart shown in FIG. 11 are detailed procedures performed in step S44 (FIG. 6).

The procedure in step S44 is obtaining luminance-level correcting points P[i] that constitute gradation correcting curves (gamma curves) for correcting gradation of low-frequency components of input video signals, using the corrected luminance histogram data CorrYhist[i] and the gain-correcting values Gss, which is performed by the processor 4 as follows:

initializing both of the variable (gradation) "i" and an integral value "sum" of the luminance-level correcting points P[i] to "0", in step S201;

determining whether the variable "i" is smaller than "16", in step S202 (proceeding to step S203 if "i" is smaller than "16" whereas to step S208 if equal to or larger than "16");

in step S203, reading the corrected luminance histogram data CorrYhist[i] from the memory, obtained according to the equation (8) in S117 (FIG. 7), the read data being CorrYhist[0] due to initialization of the variable (gradation) "i" to "0" in step S201;

offsetting the read corrected luminance histogram data CorrYhist[i], in step S204, using the average value CorrYhist_Ave of CorrYhist[i] (i=0 to 15) according to an equation (11) shown below, $$integ = (CorrYhist[i] - CorrYhist\_Ave) \times 16 / CorrYhist\_Ave \quad (11)$$

in which "integ" indicates an offset value;

updating the offset value "integ", in step S205, using a predetermined gain G, prestored in a memory (not shown) of the processor 4, and the gain-correcting value Gss obtained as described above with respect to FIG. 10, according to an equation (12) shown below, $$integ = integ \times G \times Gss \quad (12)$$

adding the updated offset value "integ" to the integral value "sum" of the luminance-level correcting points P[i], in step S206, the resultant "sum" being equal to the offset value "integ" updated in step S205 due to i=sum=0 in step S201;

obtaining a luminance-level correcting point P[i] of the corrected luminance histogram data CorrYhist[i], in step S207, using the resultant "sum" of step S206, according to an equation (13) shown below, $$P[i] = sum / 16 \quad (13)$$

whereby the obtained luminance-level correcting point P[i] determined is once stored in a memory (not shown) of the processor 4; and on completion of step S207, incrementing the variable "i" by "1" (returning to step S202 and repeating steps S202 to S207 until the variable "i" becomes "15").

Figure 12:
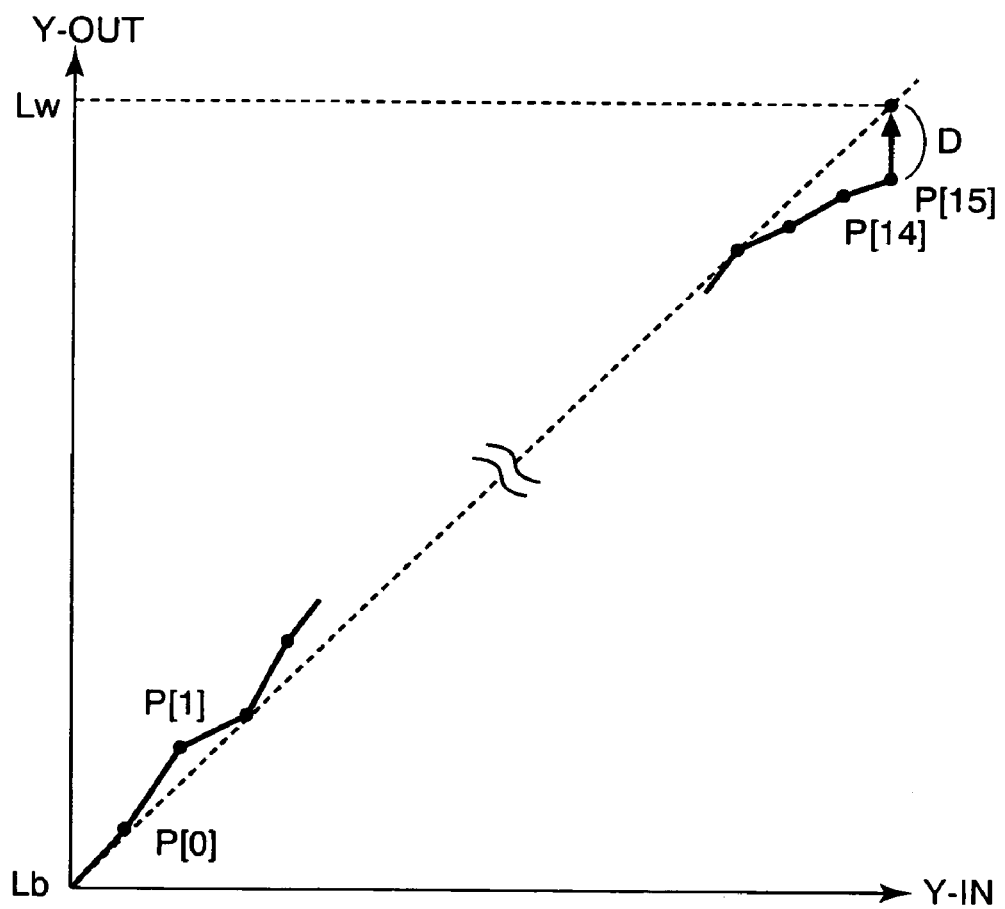
FIG. 12 is an exemplary gamma curve obtained in step S44.

Through steps S202 to S207, the luminance-level correcting points P[0] to P[15] are obtained for a gamma curve that is a gradation correction curve. Shown in FIG. 12 is an exemplary gamma curve constituted by the points P[0] to P[15], in which abscissa and ordinate values indicate the input luminance signal (Y-IN) and output luminance signal (Y-OUT), respectively.

When the luminance-level correcting point P[15] is obtained in step S207 of FIG. 11, the variable "i" becomes "16" and hence the variable "i" is determined as not smaller than "16" in S202, the process proceeding to step S208 and the following steps in which the processor 4 performs:

obtaining a difference "D" between a specific white level and a current white level (P[15]) in order to adjust the current white level to the specific white level, in step S208, according to an equation (14) shown below, $$D = Lw - Lb - P[15] \quad (14)$$

in which Lw and Lb indicate specific white and black levels, respectively, Lb=0 in the embodiment;

initializing the variable "i" to "0" again, in step S209;

determining whether the variable "i" is smaller than "16", in step S210 (proceeding to step S211 if "i" is smaller than "16" whereas to step S45 of FIG. 6, if equal to or larger than "16");

in step S211, adjusting a white level at each luminance-level correcting point P[i] in accordance with the difference "D", given by adjustments to the current white level to the specific white level Lw, according to an equation (15) shown below, $$P[i] = D \times (i+1) / 16 + Lb \quad (15)$$

whereby each luminance-level correcting point P[i] at which the white level is adjusted in step S211 is temporarily stored in a memory (not shown) of the processor 4;

on completion of step S211, incrementing the variable "i" by "1" (returning to step S210 and repeating step S211 until the variable "i" becomes "15"); and when the luminance-level correcting point P[15] is adjusted in step S211, the variable "i" becomes "16" and hence the variable "i" is determined as not smaller than "16" in step S209, the process proceeding to step S45 (FIG. 6) to perform the normalization limiting procedure to the white-level-adjusted points P[0] to P[15] obtained in step S211. Although, different from the points P[0] to P[15] shown in FIG. 9, the white-level-adjusted points are given the same reference signs P[0] to P[15] for brevity.

Figure 13:
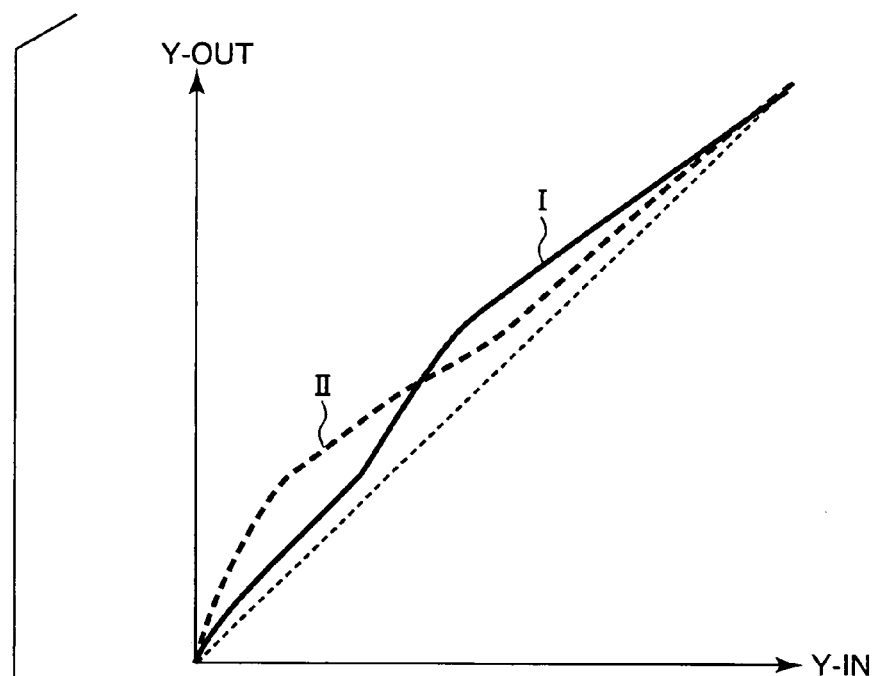
FIG. 13 shows gamma curves obtained through a luminance histogram correction procedure, according to the present invention, and gamma curves obtained with no such procedure.
Figure 13:
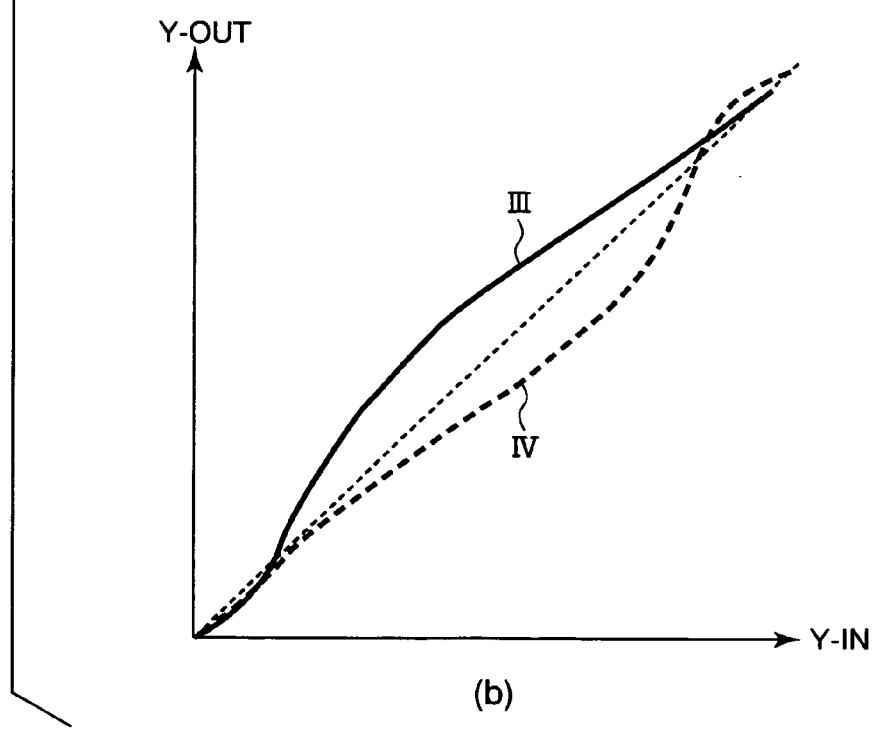

Shown in (a) and (b) of FIG. 13 are: gamma curves I and III obtained through the luminance histogram correction procedure, in step S42 (FIG. 6), to the luminance histogram data based on the high-frequency component histogram data; and gamma curves II and IV obtained with no such correction procedure. Moreover, shown in (a) and (b) of FIG. 13 are the gamma curves obtained based on the luminance histogram data shown in FIGS. 8 and 9, respectively.

In (a) of FIG. 13: the gamma curve II inevitably serves to give more gradation to a dark flat section that occupies a large area in an image to cause black floating and a large difference in gradation between the dark section and a bright section of a small area; whereas the gamma curve II obtained through the procedures in the embodiment serves to give the gradation of a dark section once given to a large area of an image to a bright section of a small area of the image, having intermediate luminance levels in which an object exists so that high contrast is given to the object with a dark section unchanged.

In (b) of FIG. 13: the gamma curve IV inevitably serves to give the gradation to a bright flat section that occupies a large area of an image so that the output luminance signal (Y-OUT) is small for the input luminance signal (Y-IN) having intermediate luminance levels in which an object exists, causing a darker object; whereas the gamma curve III obtained through the procedures in the embodiment serves to give the gradation of a bright flat section once given to a large area of an image to an object section at intermediate luminance levels, a higher contrast ratio to the object.

Described next are detailed procedures performed in step S45 (FIG. 6) for the normalization limiting procedure to the white-level-adjusted points P[0] to P[15] obtained in step S211 (FIG. 11).

The procedures performed by the processor 4 in step S45 are:

obtaining difference values Psub[i] between the white-level-adjusted points P[i] and linear data obtained by ($256 \times (i+1)/16$), according to an equation (16) shown below, $$Psub[i]=P[i]-(256 \times (i+1)/16) \quad (16)$$

in which "i" ranges from 0 to 15;

obtaining the maximum value Psub_max of the absolute values of Psub[i] and determining whether Psub_max is larger than a reference value P_th;

performing the normalization limiting procedure to the difference values Psub[i] (i=0 to 15) only when the maximum value Psub_max is determined as larger than the reference value P_th, according to an equation (17) shown below, $$Psub[i]=Psub[i] \times P\_th/Psub\_max) \quad (17)$$

whereas no procedures are applied to the difference values Psub[i] when the maximum value Psub_max is determined as equal to or smaller than the reference value P_th; and Adding the linear data to the difference values Psub[i] thus corrected through the normalization limiting procedure, according to an equation (18) shown below, $$P[i]=Psub[i]+(256 \times (i+1)/16) \quad (18)$$

whereby the resultant P[i] are subjected to step S46, as the corrected points P[i].

Figure 14:
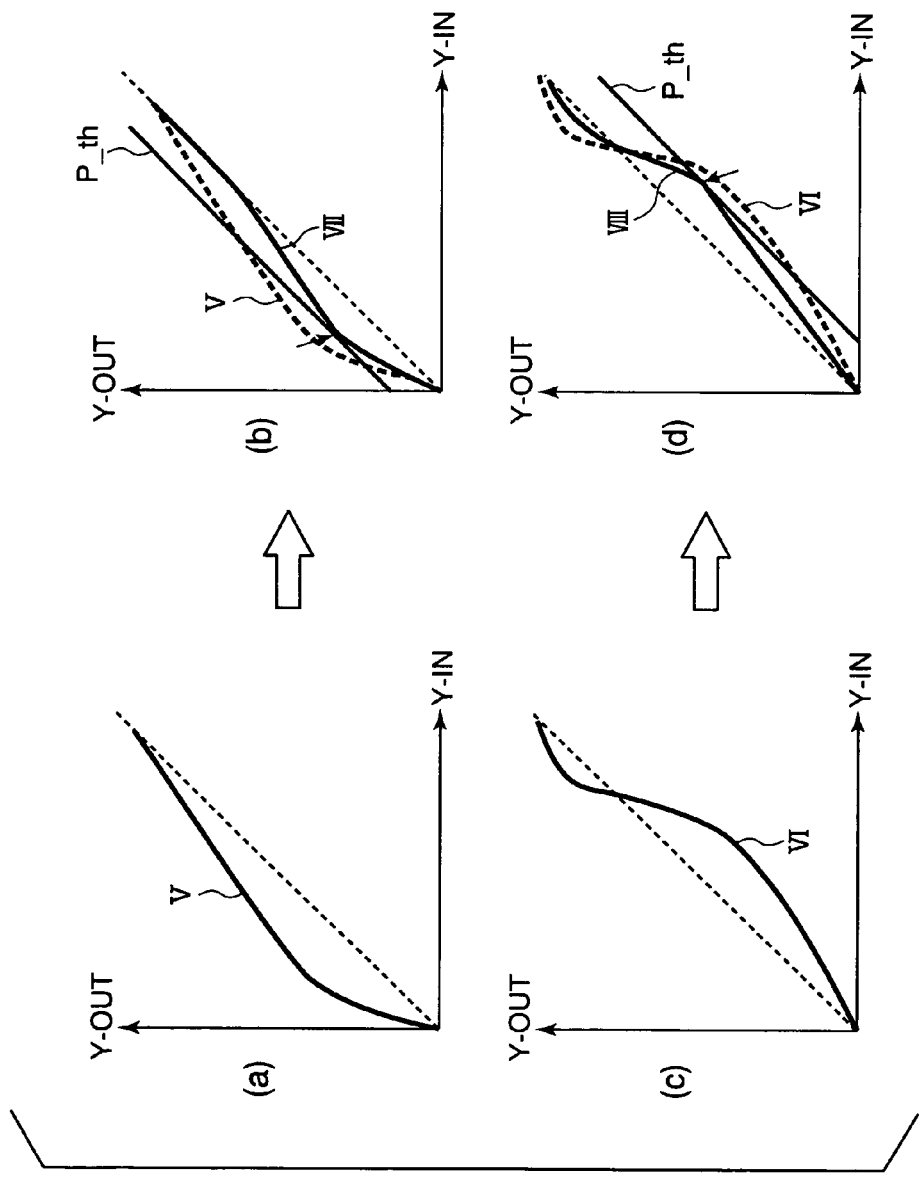
FIG. 14 illustrates a normalization limiting procedure performed in step S45 of FIG. 6.

Shown in (a) to (d) of FIG. 14 is the normalization limiting procedure performed in step S45.

Illustrated in (a) and (b) of FIG. 14 is a positive upper-limiting procedure in which the absolute values of the difference values Psub[i] indicated by a solid line V in (a) is subjected to the limiting procedure as indicated by a solid line VII in (b) if larger than a positive reference value P_th.

Illustrated in (c) and (d) of FIG. 14 is a negative lower-limiting procedure in which the absolute values of the difference values Psub[i] indicated by a solid line VI in (a) is subjected to the limiting procedure as indicated by a solid line VIII in (b) if smaller than a negative reference value P_th.

Described next are detailed procedures performed in step S46 (FIG. 6) for the time-domain leaky integration procedure to the corrected points P[i] obtained according to the equation (18).

Figure 15:
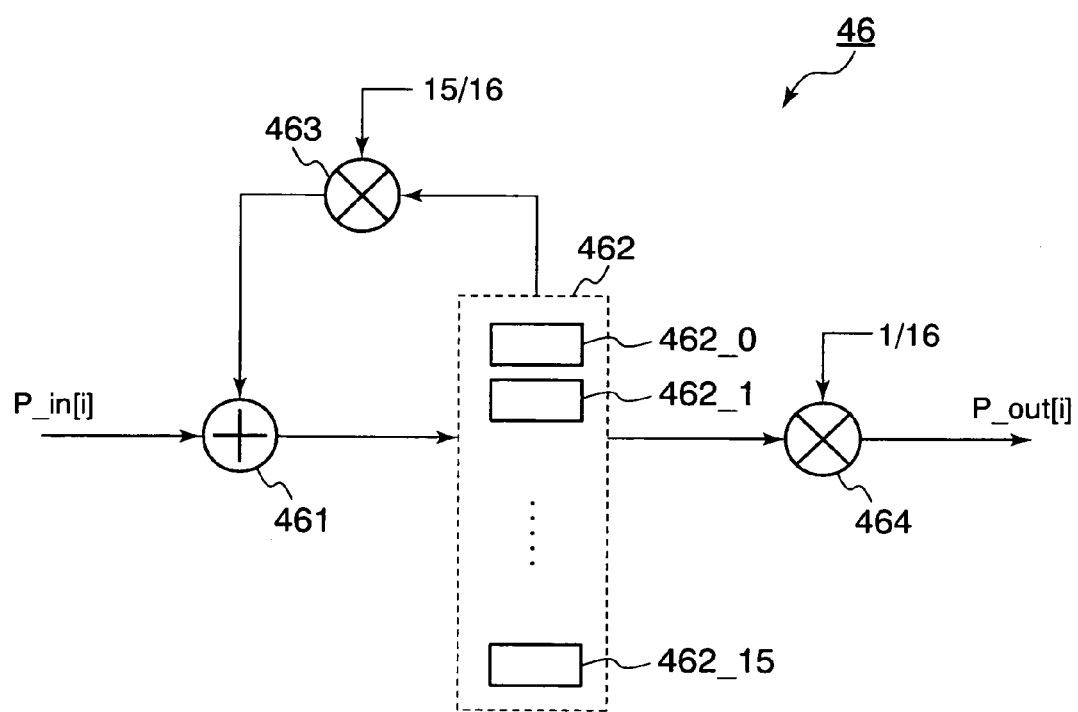
FIG. 15 shows an exemplary circuitry of a leaky integration circuit installed in the processor according to the present invention.

FIG. 15 shows an exemplary circuitry of a leaky integration circuit 46 installed in the processor 4, for performing the time-domain leaky integration procedure.

The leaky integration circuit 46 is equipped with an adder 461, a register unit 462, and multipliers 463 and 464. The register unit 462 includes 16 registers 462_0 to 462_15, in this embodiment.

The register unit 462 sequentially outputs data stored in the registers 462_0 to 462_15 to the multiplier 463. The multiplier 463 multiplies each of the sequentially input data by 15/16, the resultant values being sent to the adder 461.

When receiving the corrected points P_in[i] obtained according to the equation (18) in step S45, the adder 461 adds the corrected points P_in[i] and the multiplied values sent from the multiplier 463, the resultant values being sent to the register unit 462 and sequentially stored in the registers 462_0 to 462_15.

The register unit 462 sequentially reads the values from the registers 462_0 to 462_15 and outputs them to the multiplier 464. The multiplier 464 multiplies each of the sequentially input values by $\frac{1}{16}$, the resultant values being output from the leaky integration circuit 46, as output data P_out[i].

The output data P_out[i] obtained as described above through the time-domain leaky integration procedure are gamma data that serve to moderately vary an image to give more natural image quality than the input corrected points P[i]. Then, in step S47 (FIG. 6), the output data P_out[i] (i=0 to 15) obtained through the several procedures described with respect to FIGS. 6 to 15 is supplied from the processor 4 to the gradation corrector 5 (FIG. 1), so that the data P_out[i] is set in the corrector 5 as gamma data.

With reference to FIG. 1 again, when receiving the data P_out[i] (i=0 to 15), the gradation corrector 5 produces a gradation correction curve by applying linear interpolation to the data P_out[i], as described with respect to FIG. 12, and applies gradation correction to the low frequency components of the luminance signal sent from the LPF 1 in accordance with the gradation correction curve.

The gradation-corrected low frequency components of the luminance signal is then supplied to the adder 6 and chrominance gain generator 7.

When receiving gradation-corrected low frequency components of the luminance signal, the adder 6 adds the low frequency components and the high frequency components of the input luminance signal sent from the adder 2 to produce an output gradation-corrected luminance signal (Y-OUT) in the same frequency band as the input video signal.

The gradation correction procedure described above in this embodiment is a luminance-gradation correction procedure applied to input luminance signals (Y-IN), or luminance signal components of input video signals. Applying the correction procedure to the luminance signal components only, however, causes change in color gradation. Thus, a color-gradation correction procedure is required to chrominance signal components of input video signals.

In FIG. 1, the color-gradation correction procedure is performed by the chrominance gain generator 7 and the multiplier unit 8 to chrominance signal components of input video signals.

The chrominance gain generator 7 generates a chrominance gain α1 based on a ratio (B/A) in which "A" is a low frequency component of the luminance signal from the LPF 1 and "B" is a low frequency component of the gradation-corrected luminance signal from the gradation corrector 5. The chrominance gain α1 is the same value as the ratio (B/A) or any value in proportion to the ratio (B/A). The gain α1 is then supplied to the multiplier unit 8.

The multiplier unit 8 consists of multipliers 81 and 82. The multiplier 81 multiplies the chrominance signal (R-Y) of the input video signal by the chrominance gain α1 to output a corrected chrominance signal (R-Y). The multiplier 82 multiplies the chrominance signal (B-Y) of the input video signal by the chrominance gain α1 to output a corrected chrominance signal (B-Y).

The three primary color signals of green, blue, and red may be supplied to the multiplier unit 8 instead of the chrominance signals (R-Y) and (B-Y).

As described in detail, the present invention achieves the gradation correction procedure with appropriate gradation application to offer high image quality with high contrast by producing a gradation correction curve for each picture plane "f", one field or one frame, as illustrated in FIG. 2, based on corrected luminance histogram data produced by means of luminance histogram data and high-frequency component histogram data of luminance components of an input video signal, thus the gradation of a large flat area of an image being applied to an important object in the image.

Moreover, according to the present invention, the color-gradation correction procedure to chrominance components of the input video signal enhances high image quality with high contrast.

What is claimed is:

1. A video signal processing method comprising the steps of:
   extracting low-frequency components of a luminance signal from an input video signal at frequencies equal to or lower than a reference frequency, for pixels contained in a specific area of an image carried by the input video signal;
   allocating the low-frequency components of the luminance signal to a plurality of gradation levels that range from maximum to minimum luminance levels exhibited by the luminance signal to produce luminance histogram data that indicates the distribution of the gradation levels for the pixels;
   allocating the gradation levels to the pixels based on the luminance signal to produce high-frequency component histogram data that indicates the distribution of the gradation levels for specific pixels among the pixels, the specific pixels carrying high frequency components of the luminance signal, the high-frequency components being equal to or higher than a reference high frequency;
   correcting the luminance histogram data in accordance with the distribution of the gradation levels in the high-frequency component histogram data to produce corrected luminance histogram data;
   producing a gradation correction curve for correcting the gradation exhibited by the input video signal using the corrected luminance histogram data; and
   correcting the low-frequency components of the luminance signal of the input video signal based on the gradation correction curve, with no correction of the high-frequency components of the luminance signal.

2. The video signal processing method according to claim 1, wherein the step of correcting the luminance histogram data includes the steps of:
   determining whether a first value based on the luminance histogram data at each gradation level is equal to or larger than a first reference value;
   determining whether a second value based on the luminance histogram data at a specific gradation level is equal to or larger than a second reference value, when the first value based on the specific gradation level is determined as equal to or larger than the first reference value; and
   correcting luminance data at the specific gradation level in the luminance histogram data based on the high-frequency component histogram data, when the second value at the specific gradation level is determined as equal to or larger than the second reference value.

3. The video signal processing method according to claim 1, wherein the step of producing the gradation correction curve includes the steps of:
   obtaining gain-correcting values that becomes smaller as variances becomes larger, the variances becoming larger as the corrected luminance histogram data converges on a particular gradation level of the gradation levels whereas smaller as the luminance histogram data diverges on a wide range of the gradation levels;
   obtaining offset values based on the corrected luminance histogram data; and
   applying the gain-correcting values and a predetermined constant gain to the offset values to obtain a plurality of values that constitute the gradation correction curve.

4. The video signal processing method according to claim 1 further comprising the steps of:
   generating chrominance gains in accordance with ratios of the corrected low-frequency components to the luminance signal components of the input video signal; and
   multiplying a chrominance signal of the input video signal by the chrominance gains to obtain a corrected chrominance signal.

5. A video signal processing apparatus comprising:
   a low-frequency component extractor to extract low-frequency components of a luminance signal from an input video signal at frequencies equal to or lower than a reference frequency, for pixels contained in a specific area of an image carried by the input video signal;
   a luminance histogram data producer to allocate the low-frequency components of the luminance signal to a plurality of gradation levels that range from maximum to minimum luminance levels exhibited by the luminance signal to produce luminance histogram data that indicates the distribution of the gradation levels for the pixels;
   a high-frequency component histogram data producer to allocate the gradation levels to the pixels based on the luminance signal to produce high-frequency component histogram data that indicates the distribution of the gradation levels for specific pixels among the pixels, the specific pixels carrying high-frequency components of the luminance signal, the high-frequency components being equal to or higher than a reference high frequency;
a processor to correct the luminance histogram data in accordance with the distribution of the gradation levels in the high-frequency component histogram data to produce corrected luminance histogram data and to produce a gradation correction curve for correcting the gradation exhibited by the input video signal using the corrected luminance histogram data; and
a gradation corrector to correct the low-frequency components of the luminance signal of the input video signal based on the gradation correction curve, with no correction of the high-frequency components of the luminance signal.

6. The video signal processing apparatus according to claim 5, wherein the processor corrects the luminance histogram data by:
determining whether a first value based on the luminance histogram data at each gradation level is equal to or larger than a first reference value;
determining whether a second value based on the luminance histogram data at a specific gradation level is equal to or larger than a second reference value, when the first value based on the specific gradation level is determined as equal to or larger than the first reference value; and
correcting luminance data at the specific gradation level in the luminance histogram data based on the high-frequency component histogram data, when the second value at the specific gradation level is determined as equal to or larger than the second reference value.

7. The video signal processing apparatus according to claim 5, wherein the processor produces the gradation correction curve by:
obtaining gain-correcting values that become smaller as variances become larger, the variances becoming larger as the corrected luminance histogram data converges on a particular gradation level of the gradation levels whereas smaller as the luminance histogram data diverges on a wide range of the gradation levels;
obtaining offset values based on the corrected luminance histogram data; and
applying the gain-correcting values and a predetermined constant gain to the offset values to obtain a plurality of values that constitute the gradation correction curve.

8. The video signal processing apparatus according to claim 5 further comprising:
a chrominance gain generator to generate chrominance gains in accordance with ratios of the corrected low-frequency components to the luminance signal components of the input video signal; and
a multiplier to multiply chrominance signal of the input video signal by the chrominance gains to obtain a corrected chrominance signal.

9. A video signal processing method comprising the steps of:
extracting low-frequency components from an input video signal at frequencies equal to or lower than a reference frequency, for pixels contained in a specific area of an image carried by the input video signal;
allocating the low-frequency components, based on luminance signal components of the input video signal, to a plurality of gradation levels that range from maximum to minimum luminance levels exhibited by the luminance signal components, thus producing luminance histogram data that indicates the frequency of the gradation levels for the pixels;
allocating the gradation levels to the pixels based on the luminance signal components to produce high-frequency component histogram data that indicates the frequency of the gradation levels for specific pixels among the pixels, each specific pixel carrying a high-frequency component equal to or higher than a reference high frequency;
correcting the luminance histogram data in accordance with the frequency of the gradation levels in the high-frequency component histogram data to produce corrected luminance histogram data;
producing a gradation correction curve for correcting the gradation exhibited by the input video signal using the corrected luminance histogram data; and
correcting the luminance signal components of the input video signal based on the gradation correction curve,
wherein the step of correcting the luminance histogram data includes the steps of:
determining whether a first value based on the luminance histogram data at each gradation level is equal to or larger than a first reference value;
determining whether a second value based on the luminance histogram data at a specific gradation level is equal to or larger than a second reference value, when the first value based on the specific gradation level is determined as equal to or larger than the first reference value; and
correcting luminance data at the specific gradation level in the luminance histogram data based on the high-frequency component histogram data, when the second value at the specific gradation level is determined as equal to or larger than the second reference value.

10. The video signal processing method according to claim 9, wherein the step of producing the gradation correction curve includes the steps of:
obtaining gain-correcting values that become smaller as variances become larger, the variances becoming larger as the corrected luminance histogram data converges on a particular gradation level of the gradation levels whereas smaller as the luminance histogram data diverges on a wide range of the gradation levels;
obtaining offset values based on the corrected luminance histogram data; and
applying the gain-correcting values and a predetermined constant gain to the offset values to obtain a plurality of values that constitute the gradation correction curve.

11. The video signal processing method according to claim 9 further comprising the steps of:
generating chrominance gains in accordance with ratios of the corrected luminance signal components to the luminance signal components of the input video signal; and
multiplying chrominance signal components of the input video signal by the chrominance gains to obtain corrected chrominance signal components.

12. A video signal processing apparatus comprising:
a low-frequency component extractor to extract low-frequency components from an input video signal at frequencies equal to or lower than a reference frequency, for pixels contained in a specific area of an image carried by the input video signal;
a luminance histogram data producer to allocate the low-frequency components, based on luminance signal components of the input video signal, to a plurality of gradation levels that range from maximum to minimum luminance levels exhibited by the luminance signal components, thus producing luminance histogram data that indicates the frequency of the gradation levels for the pixels;

a high-frequency component histogram data producer to allocate the gradation levels to the pixels based on the luminance signal components to produce high-frequency component histogram data that indicates the frequency of the gradation levels for specific pixels among the pixels, each specific pixel carrying a high-frequency component equal to or higher than a reference high frequency;

a processor to correct the luminance histogram data in accordance with the frequency of the gradation levels in the high-frequency component histogram data to produce corrected luminance histogram data and to produce a gradation correction curve for correcting the gradation exhibited by the input video signal using the corrected luminance histogram data; and a gradation corrector to correct the luminance signal components of the input video signal based on the gradation correction curve, wherein the processor corrects the luminance histogram data by:

determining whether a first value based on the luminance histogram data at each gradation level is equal to or larger than a first reference value;

determining whether a second value based on the luminance histogram data at a specific gradation level is equal to or larger than a second reference value, when the first value based on the specific gradation level is determined as equal to or larger than the first reference value; and correcting luminance data at the specific gradation level in the luminance histogram data based on the high-frequency component histogram data, when the second value at the specific gradation level is determined as equal to or larger than the second reference value.

13. The video signal processing apparatus according to claim 12, wherein the processor produces the gradation correction curve by:

obtaining gain-correcting values that become smaller as variances become larger, the variances becoming larger as the corrected luminance histogram data converges on a particular gradation level of the gradation levels whereas smaller as the luminance histogram data diverges on a wide range of the gradation levels;

obtaining offset values based on the corrected luminance histogram data; and applying the gain-correcting values and a predetermined constant gain to the offset values to obtain a plurality of values that constitute the gradation correction curve.

14. The video signal processing apparatus according to claim 12 further comprising:

a chrominance gain generator to generate chrominance gains in accordance with ratios of the corrected luminance signal components to the luminance signal components of the input video signal; and a multiplier to multiply chrominance signal components of the input video signal by the chrominance gains to obtain corrected chrominance signal components.

* * * * *